US008965346B2

(12) United States Patent
Shin

(10) Patent No.: US 8,965,346 B2
(45) Date of Patent: Feb. 24, 2015

(54) APPARATUS FOR TRANSMITTING MEDIA USING SOCIAL INTIMACY AND METHOD THEREOF

(75) Inventor: Young-Shik Shin, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 729 days.

(21) Appl. No.: 12/456,611

(22) Filed: Jun. 19, 2009

(65) Prior Publication Data

US 2009/0318165 A1 Dec. 24, 2009

(30) Foreign Application Priority Data

Jun. 19, 2008 (KR) ........................ 10-2008-0058071

(51) Int. Cl.
H04M 3/42 (2006.01)
H04W 64/00 (2009.01)
G06F 21/62 (2013.01)
G06Q 30/02 (2012.01)
G06Q 50/00 (2012.01)
H04W 8/22 (2009.01)
H04W 84/10 (2009.01)
H04W 84/18 (2009.01)
H04W 92/18 (2009.01)

(52) U.S. Cl.
CPC ............ *G06F 21/6263* (2013.01); *G06Q 30/02* (2013.01); *G06Q 50/01* (2013.01); *H04W 8/22* (2013.01); *H04W 84/10* (2013.01); *H04W 84/18* (2013.01); *H04W 92/18* (2013.01)
USPC ....................... 455/414.1; 455/41.2

(58) Field of Classification Search
CPC ................... H04M 1/274508; H04M 1/72569; H04M 1/72572; H04W 4/02; H04W 4/008; H04W 88/04; H04W 88/06
USPC .......................... 455/414.1–417, 456.1–457, 455/404.1–404.2, 41.2
See application file for complete search history.

(56) References Cited

U.S. PATENT DOCUMENTS

| 2002/0161838 | A1* | 10/2002 | Pickover et al. | 709/204 |
| 2005/0174975 | A1* | 8/2005 | Mgrdechian et al. | 370/338 |
| 2007/0255785 | A1* | 11/2007 | Hayashi et al. | 709/204 |
| 2008/0147639 | A1* | 6/2008 | Hartman et al. | 707/5 |

* cited by examiner

*Primary Examiner* — Vladimir Magloire
*Assistant Examiner* — Erica Navar

(57) ABSTRACT

Disclosed is an apparatus and method for transmitting media data using social intimacy. The apparatus and method can calculate a social intimacy level for a plurality of previously stored terminal information, request at least one terminal of transmitting terminal information according to a media transmission request, and when receiving the requested terminal information from at least one terminal, transmit the media data to a terminal where the terminal information equals the received terminal information among terminal information having higher social intimacy, thereby sharing the media data with people forming a higher social intimacy with a user.

21 Claims, 3 Drawing Sheets

APPARATUS FOR TRANSMITTING MEDIA USING SOCIAL INTIMACY AND METHOD THEREOF

CROSS-REFERENCE TO RELATED APPLICATION(S) AND CLAIM OF PRIORITY

The present application is related to and claims the benefit under 35 U.S.C. §119(a) of an application entitled "Apparatus for Transmitting Media Using Social Intimacy and Method Thereof" filed in the Korean Industrial Property Office on Jun. 19, 2008 and assigned Ser. No. 10-2008-0058071, the contents of which are hereby incorporated by reference.

TECHNICAL FIELD OF THE INVENTION

The present invention relates to an apparatus and a method for transmitting media data using social intimacy, and more particularly to an apparatus and a method for transmitting media data to users having higher social intimacy through a Wireless Personal Area Network (WPAN).

BACKGROUND OF THE INVENTION

In general, a user generates media data that he or she wants, such as a photograph and moving images, using a mobile telecommunication terminal with a camera, e.g., a cell phone or a Personal Digital Assistants (PDA). If a user intends to share the media data with his friend, he or she can transmit the media data stored in a mobile telecommunication terminal to a wired terminal such as a Personal Computer (PC). Then, the user accesses an internet network through the wired terminal, retrieves a web page to which to transmit the media data and shares the media data on the retrieved web page. When the media data is shared on a web page, other users can access the web page, which has received the media data, via the internet and download the corresponding media data.

In such prior art, a user, who wants to share media data, used to share media data generated through a mobile telecommunication terminal on a web page using an internet network, and then other users could download the media data. However, when the media data is shared in this way, a problem occurs in that other users, besides the friend with whom the user wishes to share, are able to access the web page and download the media data.

In addition, a problem exist in that the friend that the user wishes to share is required to access the web page via an internet using a wired terminal and download the shared media data in order to download the media data.

Therefore, the present invention provides an apparatus for transmitting media data using social intimacy between users and a method thereof.

SUMMARY OF THE INVENTION

To address the above-discussed deficiencies of the prior art, it is a primary object to provide a media transmitting apparatus using social intimacy, the apparatus including a memory unit for storing a plurality of terminal information and a plurality of media data, a social intimacy calculating unit for calculating a social intimacy level that indicates the degree of the social intimacy as a figure, and a control unit for calculating a social intimacy level for the plurality of terminal information stored in the memory unit using the social intimacy calculating unit and thus determining whether at least one of terminal corresponding to the extracted terminal information is located within a specific communication services area, transmitting the media data to a specific terminal from among the at least one of terminal corresponding to the extracted terminal information when the at least one of terminal corresponding to the extracted terminal information is located within the specific communication services area.

In accordance with another aspect of the present invention, a media transmitting method using social intimacy is provided. The method includes the step of calculating a social intimacy level that indicates the degree of the social intimacy as a figure for a plurality of pieces of terminal information previously stored. The method also includes determining whether at least one of terminal corresponding to the extracted terminal information is located within a specific communication services area, transmitting the media data to a specific terminal from among the at least one of terminal corresponding to the extracted terminal information when the at least one of terminal corresponding to the extracted terminal information is located within the specific communication services area.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
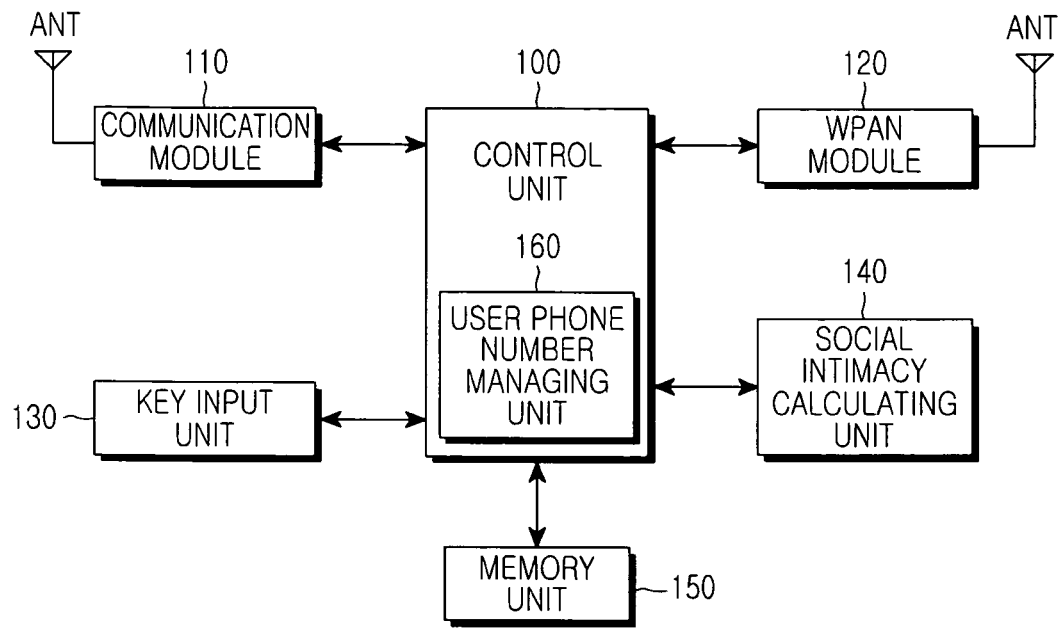
FIG. 1 illustrates a construction diagram of a mobile terminal according to the present invention.
Figure 2:
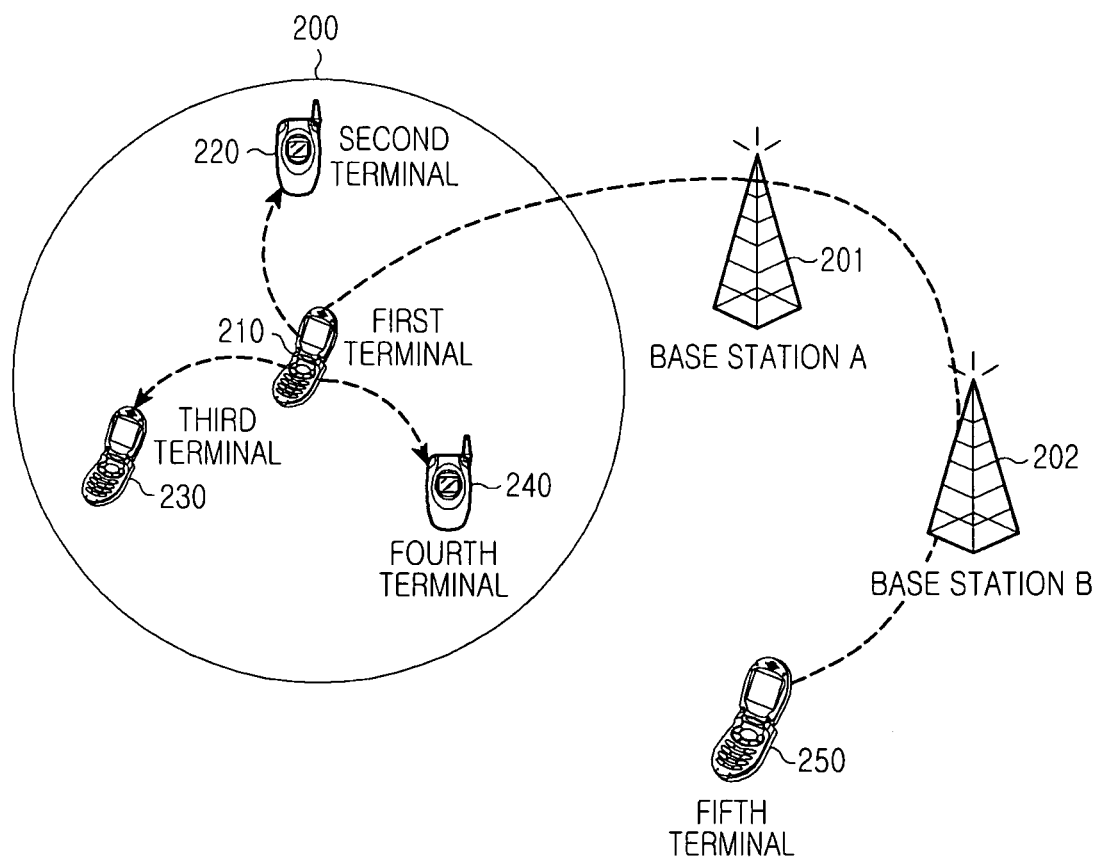
FIG. 2 illustrates an exemplary diagram of describing the transmission of media data to a mobile terminal having higher social intimacy according to an embodiment of the present invention.
Figure 3:
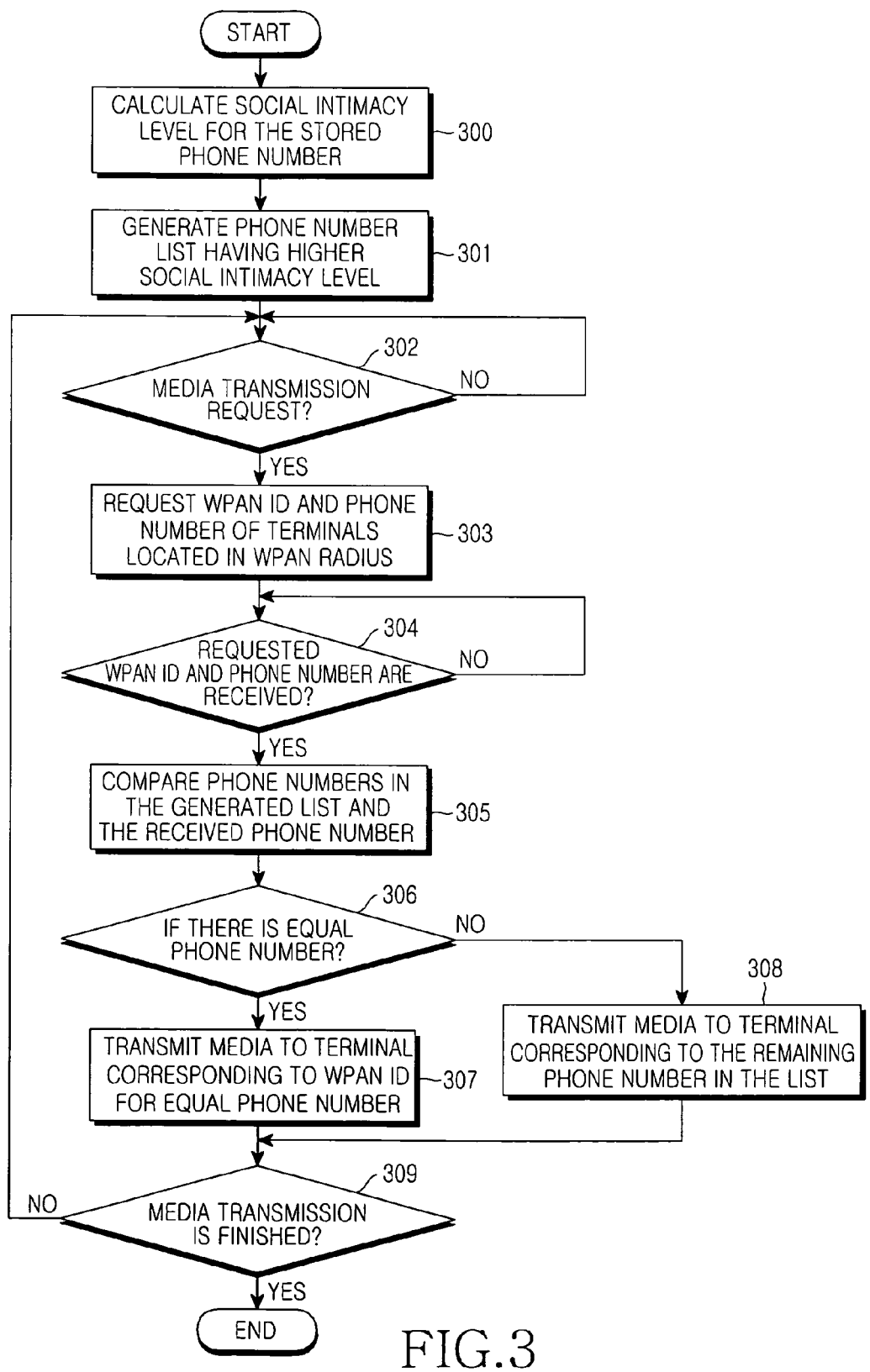
FIG. 3 illustrates a flow chart showing the procedure of transmitting media data using a social intimacy level.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged global communication network.

In the following, components of a media transmitting apparatus and the operation of each component according to an embodiment of the present invention will be described in detail with reference to FIG. 1. An embodiment of the present invention will be described by an example of a mobile terminal which transmits media data through WPAN such as Bluetooth®, Zigbee® and UWB (Ultra Wide Band).

FIG. 1 illustrates a construction diagram of a mobile terminal according to an embodiment of the present invention.

A mobile terminal according to the present invention includes a control unit 100, a communication module 110, a WPAN module 120, a key input unit 130, a social intimacy calculating unit 140, a memory unit 150 and a user phone number managing unit 160.

The control unit 100 controls the general operation of the mobile terminal. In particular, the control unit 100 calculates a social intimacy level for each of the phone numbers stored in the memory unit 150 using the social intimacy calculating unit 140, wherein the social intimacy calculating unit 140 calculates a social intimacy level that indicates the degree of the social intimacy as a figure. Such social intimacy levels can be calculated by Equation 1:

$$\text{Social intimacy level} = a^*\text{the number of calls} + b^*\text{the duration of a call} + c^*\text{sending/receiving times of text messages} \quad [\text{Eqn. 1}]$$

In Equation 1, each letter a, b and c refers to a weight.

The social intimacy level can be calculated through the number of calls with other mobile terminal, the duration of a call, sending/receiving times of text messages, and the like, and it will be understood that the higher the calculated social intimacy level is, the higher social intimacy is. Also, the present invention can calculate a social intimacy level by a value from summing up each times like Equation 1, but also can calculate the social intimacy level by only examining the number of calls, the duration of a call, sending/receiving times of text messages, and so forth, according to users' occupation. For example, if a user is a salesman having lots of call times with other parties, a social intimacy level can be calculated only by the number of calls. In addition, if a user is a student frequently using a text message service, a social intimacy level can be calculated only by sending/receiving times of text messages.

Then, the control unit 100 sorts phone numbers in the order that a calculated social intimacy level is higher, and generate a phone number list that contains phone numbers having higher intimacy levels among the sorted phone numbers. In some embodiments, the phone number list includes a predetermined number of phone numbers in higher social intimacy level order, wherein the predetermined number of phone numbers can be previously set to transmit media data from a user. For example, when the number predetermined by a user is equal to five (5), the phone number list includes the corresponding five (5) phone numbers in a higher social intimacy level order. In some embodiments, a phone number list includes some phone numbers selected by a user from telephone numbers having higher social intimacy. For example, if a user selects only the phone numbers classified as a friends list among phone numbers, the phone number list includes only the phone numbers classified as the friends list among phone numbers having higher social intimacy.

When there is a request to transmit media data to users with higher social intimacy through a key input unit 130, the control unit 100 requests that each of other mobile terminal within a WPAN radius where the mobile terminal is located transmit a WPAN ID and a phone number. When the requested WPAN ID and phone number are received from each of the other mobile terminals through the WPAN module 120, the control unit 100 compares the telephone numbers included in the phone number list generated through the user phone number managing unit 160 included in the control unit 100 and phone numbers received through the WPAN module 120 to check if there is an equal phone number. If there is an equal phone number, the control unit 100 transmits media data to a terminal corresponding to a WPAN ID of the equal phone number. Thus, a user directly transmits media data to another party having higher social intimacy to which media data is to be transmitted. In particular, data in WPAN is transmitted using a point-to-point protocol or a point-to-multipoint protocol such as Peer-to-Peer (P2P), and therefore media data can be transmitted without a cost to a plurality of users.

If a phone number in the generated phone number list is unequal to the phone numbers received through the WPAN module 120, the control unit 100 transmits media data to mobile phones corresponding to the remaining unequal phone numbers. In some embodiments, the control unit 100 can transmit media data over a cellular network using Short Message Service (SMS) or Wireless Communications Service (WCS).

The communication module 110 can transmit media data over a cellular network and receive the transmitted data over the cellular network.

The WPAN module 120 requests of transmitting a WPAN ID and a phone number over WPAN and receives the WPAN ID and the phone number. Also, the WPAN module 120 transmits media data over WPAN.

The key input unit 130 includes a key for transmitting media data to a mobile terminal having a higher social intimacy, and the key input unit 130 can transmit data of a key value corresponding to a key pressed by a user to the control unit 100.

The social intimacy calculating unit 140 calculates the social intimacy level for phone numbers stored in the memory unit 150. For example, the social calculating unit 140 calculates the social intimacy level using Equation 1 as described above.

The memory unit 150 stores phone numbers and media data to be transmitted.

The user phone number managing unit 160 is included in the control unit 100. The user phone number managing unit 160 compares phone numbers included in the generated phone number list and phone numbers received through the WPAN module 120 to check if there is an equal phone number.

As described above, a method of transmitting media data to users having higher social intimacy will be described in detail with reference to FIG. 2.

FIG. 2 illustrates an exemplary diagram for describing the transmission of media data to a mobile terminal having higher social intimacy according to an embodiment of the present invention.

In an illustrative example the total number of calls of a first terminal 210 equals one hundred (100), the number of calls with a second terminal 220 equals forty (40), the number of calls with a third terminal 230 equals thirty-five (35) and the number of calls with a fourth terminal equals twenty-five (25). Here, with regard to the social intimacy with the first terminal 210, the second terminal is the highest, and the third terminal is the next highest, and the fourth terminal is the third highest. If the number of a preset phone number to transmit media data equals three (3), the first terminal 210 transmits media data in the order of higher social intimacy levels. For example, transmission of media from the first terminal is performed the order of the second terminal first, the third terminal second, and the fourth terminal thirdly, over WPAN 200. If a fifth terminal 250 that is not included in WPAN 200 among terminals having higher social intimacy exists, then the first terminal 100 transmits media data to the fifth terminal 250 via a base station A 201 and a base station B 202. At this time, the first terminal 100 can transmit a text message including media data to the fifth terminal 250.

In the following, a procedure of transmitting media data to the mobile terminal having higher social intimacy from one mobile terminal as shown in FIG. 1 and according to an embodiment of the present invention will be described with reference to FIG. 2 and FIG. 3. The transmitting procedure will be discussed by way of an example of a mobile terminal that transmits media data over WPAN.

FIG. 3 illustrates a flow chart showing the procedure of transmitting media data using a social intimacy level according to an embodiment of the present invention.

According to an embodiment of the present invention, the transmitting procedure will be explained by an example of transmitting media data by a mobile terminal via WPAN.

In step 300, the control unit 100 calculates a social intimacy level for phone numbers stored in a memory unit 150. The social intimacy level can be calculated using Equation 1 as mentioned above. Additionally, the social intimacy level can be calculated using at least one of the number of calls, the duration of a call and sending/receiving times of text messages.

In step 301, the control unit 100 sorts the phone numbers in the order that the calculated social intimacy level is higher, and generates a phone number list that includes as many numbers as predetermined by a user among the sorted phone numbers. For example, if a user sets the number of phone numbers to be included in the phone number list as three (3), the phone number list includes three phone numbers among phone numbers sorted in the order of higher social intimacy level.

In step 302, a control unit 100 checks if there is a request of transmitting media data to mobile terminals having higher social intimacy through a key input unit 130. If there is a request, the method proceeds to step 303, and if there is not a request, it checks continuously if there is a media transmission request in step 302.

In step 303, the control unit 100 requests other mobile terminals located within a WPAN radius 200 including a mobile terminal of a WPAN ID and a phone number. For example, referring to FIGURE 2, a first terminal 210 requests a second terminal 220, a third terminal 230 and a fourth terminal 240, all of which are located within the WPAN radius 200, of a WPAN ID and a phone number.

In step 304, the control unit 100 checks if a WPAN ID and a phone number requested through the WPAN module 120 are received. If they are received, the method proceeds to step 305, and if they are not received, it checks continuously if the WPAN ID and the phone number requested in step 304 are received.

In step 305, the control unit 100 compares phone numbers included in the phone number list generated through the user phone number managing unit 160 and a phone number received through the WPAN module 120.

In step 306, the control unit 100 checks if there is one of the phone numbers included in the generated phone number list equal to the received phone number. If there is an equal phone number, the method proceeds to step 307, and if there is no equal phone number, it proceeds to step 308.

In step 307, the control unit 100 transmits media data through the WPAN module 120 to a mobile terminal corresponding to a WPAN ID for the equal phone number. As described in FIG. 2, if a fourth terminal 240 located in the WPAN area 200 does not exist in the phone number list, the control unit 100 would not transmit media data to the fourth terminal 240.

In step 308, the control unit 100 transmits media data to a mobile terminal corresponding to the remaining phone numbers that are included in the phone number list but not included within the WPAN radius. Here, the control unit 100 can transmit media data over the cellular network using a service such as a text message. For example, if the phone number of a fifth terminal 250 is included in phone numbers contained in the phone number list, the control unit 100 transmits media data to the fifth terminal 250 through the base station A 201 and the base station B 202) even though the fifth terminal 250 is not included in the WPAN radius 200. Through this, the user can transmit media data directly to a mobile terminal corresponding to a higher social intimacy phone number to which the media data is to be transmitted.

After step 307 and step 308, the control unit 100 checks if there is a request for finishing the media data transmission in step 309. If there is a finishing request, the method finishes the media data transmission procedure. If there is not a finishing request, it proceeds to step 302 and checks if there is a media data transmission request, and then performs step 303 through step 309.

The present invention can transmit media data to mobile terminals corresponding to higher social intimacy phone numbers among phone numbers to which a user wants to transmit media data.

Also, the present invention can transmit media data directly to mobile terminals corresponding to higher social intimacy phone numbers, and therefore it is unnecessary to access a web page via a wired terminal to share media data.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus configured to transmit media based on social intimacy, the apparatus comprising:
   a memory unit configured to store pieces of contact information regarding a plurality of terminals and a plurality of media data; and
   a control unit configured to;
   calculate social intimacy levels with the plurality of terminals, wherein each of the social intimacy levels indicates a degree of the social intimacy representing a frequency of contact between a user of the apparatus and users of the plurality of terminals,
   select at least one of the plurality of terminals having a high social intimacy level among the calculated social intimacy levels, the high social intimacy level representing a high frequency among frequencies of contact with the plurality of the terminals,
   request and receive contact information of each terminal within a network of the apparatus, and
   transmit the media data to the at least one of the plurality of terminals having the high social intimacy level when contact information of the at least one of the plurality of terminals having the high social intimacy level is equal to the received contact information, wherein the contact information comprises a phone number and a wireless personal area network identifier (WPAN ID).

2. The apparatus of claim 1, wherein the control unit is further configured to identify a number of terminals corresponding to the calculated social intimacy level.

3. The apparatus of claim 1, wherein the network of the apparatus is an area in which communications are enabled by the apparatus.

4. The apparatus of claim 1, further comprising:
a transmit unit configured to transmit the media data using one of Bluetooth, Zigbee, and UWB (Ultra Wide Band).

5. The apparatus of claim 1, wherein the control unit is further configured to transmit the media data to a terminal located over a cellular network.

6. The apparatus of claim 1, wherein the social intimacy levels are calculated using at least one of a number of calls, a duration of a call, and sending/receiving times of text messages.

7. The apparatus of claim 1, wherein the social intimacy levels are calculated using an equation defined by:

$$\text{Social intimacy level} = a \cdot \text{a number of calls} + b \cdot \text{a duration of a call} + c \cdot \text{sending/receiving times of text messages},$$

wherein a refers to a weight for the number of calls, b refers to a weight for the duration of a call, and c refers to a weight for sending/receiving times of text messages.

8. The media transmitting apparatus of claim 1, wherein the media data is transmitted using at least one of a point-to-point protocol and a point-to-multipoint protocol.

9. A method for transmitting media data based on social intimacy, the method comprising:
calculating social intimacy levels with a plurality of terminals corresponding to frequencies of contact with the plurality of terminals, wherein each of the social intimacy levels indicates a degree of the social intimacy representing a frequency of contact between a user of a user terminal and users of the plurality of terminals;
selecting at least one of the plurality of terminals having a high social intimacy level among the calculated social intimacy levels, the high social intimacy level representing a high frequency among frequencies of contact with the plurality of the terminals;
requesting and receiving contact information of each terminal within a network of the user terminal; and
transmitting the media data to the at least one of the plurality of terminals having the high social intimacy level when contact information of the at least one of the plurality of terminals having the high social intimacy level is equal to the received contact information,
wherein the contact information comprises at least one of a phone number and a wireless personal area network identifier (WPAN ID).

10. The method of claim 9 further comprising:
identifying a number of terminals corresponding to the high social intimacy level.

11. The method of claim 9, wherein the network is an area in which communications are enabled by the user terminal.

12. The method of claim 9, wherein the media data is transmitted using one of Bluetooth, Zigbee, and UWB (Ultra Wide Band).

13. The method of claim 9 further comprising:
transmitting the media data to a terminal located over a cellular network.

14. The method of claim 9, wherein, calculating the social intimacy levels further comprises:
calculating the social intimacy levels using at least one of a number of calls, a duration of a call, and sending/receiving times of text messages.

15. The method of claim 9, wherein the social intimacy levels are calculated using an equation defined by:

$$\text{Social intimacy level} = a \cdot \text{a number of calls} + b \cdot \text{a duration of a call} + c \cdot \text{sending/receiving times of text messages},$$

wherein a refers to a weight for the number of calls, b refers to a weight for the duration of a call, and c refers to a weight for sending/receiving times of text messages.

16. The method of claim 9, wherein transmitting the media data comprises:
transmitting using at least one of a point-to-point protocol and a point-to-multipoint protocol.

17. A network comprising a plurality of base stations capable of communicating with a plurality of mobile terminals, at least two of the mobile terminals capable of using social intimacy, each of the at least two mobile terminals comprising:
a memory unit configured to store pieces of contact information regarding the plurality of mobile terminals and a plurality of media data;
a social intimacy calculating unit configured to calculate social intimacy levels with the plurality of mobile terminals, wherein each of the social intimacy levels indicates a degree of the social intimacy representing a frequency of contact with a corresponding one of the plurality of mobile terminals; and
a control unit configured to:
generate a contact information list listing the pieces of contact information regarding the plurality of mobile terminals in order of the calculated social intimacy levels with the plurality of mobile terminals,
select, from the contact information list, a mobile terminal of the plurality of mobile terminals having a highest social intimacy level among the calculated social intimacy levels, the highest social intimacy level representing a highest frequency among frequencies of contact with the plurality of mobile terminals,
request a wireless personal area network identifier and a phone number of each mobile terminal within a radius of a wireless personal area network of the at least two mobile terminals,
determine whether the mobile terminal having the highest social intimacy level is located within the wireless personal area network of the at least two mobile terminals via the phone number received via the wireless personal area network, and
transmit the media data to the selected mobile terminal having the highest social intimacy level.

18. The network of claim 17, wherein the control unit is further configured to transmit the media data to a mobile terminal located over a cellular network.

19. The network of claim 17, wherein the control unit is further configured to request the wireless personal area network identifier and a phone number if a transmission request is received from a key input unit of each of the at least two mobile terminals.

20. The network of claim 17, wherein the social intimacy levels are calculated using at least one of a number of calls, a duration of a call, and sending/receiving times of text messages.

21. The network of claim 17, wherein the social intimacy levels are calculated using an equation defined by:

$$\text{Social intimacy level} = a \cdot \text{a number of calls} + b \cdot \text{a duration of a call} + c \cdot \text{sending/receiving times of text messages},$$

wherein a refers to a weight for the number of calls, b refers to a weight for the duration of a call, and c refers to a weight for sending/receiving times of text messages.

\* \* \* \* \*